(12) United States Patent
Kato (10) Patent No.: US 6,206,784 B1
(45) Date of Patent: Mar. 27, 2001

(54) TORQUE LIMITER

(75) Inventor: Heizaburo Kato, Ogasa-gun (JP)

(73) Assignee: Sankyo Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/150,363

(22) Filed: Sep. 9, 1998

(30) Foreign Application Priority Data

Sep. 19, 1997 (JP) .................................................. 9-255379

(51) Int. Cl.$^7$ ........................................................ F16D 7/06
(52) U.S. Cl. .............................................. 464/36; 384/516
(58) Field of Search ................................ 464/30, 35, 36, 464/48; 384/516; 192/56.62, 110 B (56) References Cited

U.S. PATENT DOCUMENTS

| | | | |
|---|---|---|---|
| 2,153,028 | * | 4/1939 | Schanzer ........................... 384/516 X |
| 3,362,761 | * | 1/1968 | Zachariassen ........................ 384/516 |
| 3,722,644 | * | 3/1973 | Steinhagen .......................... 464/36 X |
| 3,844,632 | * | 10/1974 | Ryczek .............................. 384/516 X |
| 3,889,491 | * | 6/1975 | Wanner et al. ......................... 464/36 |
| 4,611,701 | * | 9/1986 | Friedmann ........................ 192/110 B |
| 5,005,684 | * | 4/1991 | Fujii .................................. 464/36 X |
| 5,090,823 | * | 2/1992 | Lindsey et al. ....................... 384/605 |
| 5,896,968 | * | 4/1999 | Bruntz .............................. 464/36 X |

FOREIGN PATENT DOCUMENTS

| | | | |
|---|---|---|---|
| 53-67047 | 6/1978 | (JP) | . |
| 55-109828 | 8/1980 | (JP) | . |
| 59-24442 | 7/1984 | (JP) | . |
| 4-68228 | 6/1992 | (JP) | . |
| 316879 | * 10/1971 | (SU) | ...................................... 464/36 |

* cited by examiner

Primary Examiner—Anthony Knight
Assistant Examiner—Greg Binda
(74) Attorney, Agent, or Firm—Morrison & Foerster LLP (57) ABSTRACT

A torque limiting device capable of transferring torque within a power train, and also capable of disengaging the torque transfer connection when the torque level exceeds a specific point. A specific ball bearing joint is formed where a radial boss mates with the inner circumference of a flange. The ball bearing joint consists of an outer radial groove formed on the aforesaid inner circumference, an inner radial groove formed on the boss and facing the outer groove, and ball bearings inserted between the two radial grooves. Each radial groove is formed to a V-shape cross section having a radius of curvature smaller than that of the ball bearings, thus providing ball bearing support at two points within each groove, and four points of bearing support in total. Rotation of the torque output part is thus supported adequately in both the radial and axial thrust directions by a single ball bearing structure which allows the torque limiter to be made to compact dimensions.

12 Claims, 10 Drawing Sheets

TORQUE LIMITER

BACKGROUND OF THE INVENTION

1. Field of the Invention

The invention relates to a torque limiter device capable of transferring torque from a power source to a driven device, and further capable of disengaging the torque transfer connection when an overload is encountered.

2. Description of the Related Art

A torque limiter device has been put forth in Japanese unexamined patent publication No. 53-67407 (Int.Cl.F16D 7/06) and Japanese unexamined utility model publication No. 4-68228 (Int.Cl.F16D 43.20). This type of torque limiter is comprised of a torque input part connected to a torque generating power source, and a torque output part rotatably installed opposite to the aforesaid torque input part on the same shaft. A roller-type torque transmission device is installed between the aforesaid torque input and torque output parts in a manner as to allow the torque from the input side to be transferred to the output side without any power loss during normal operation. In the event that an excessive load is generated, the aforesaid torque transmission part operates so as to mechanically disengage the joint between the aforesaid torque output and torque input parts.

The aforesaid rollers are rotatably attached to the torque input part within receiver orifices formed therein, and form a connection with the torque output part by means of their partial insertion within concavities disposed opposite to the aforesaid torque input part. The rollers are preloaded at a specific pressure as means of maintaining their positions within the aforesaid concavities during normal torque transfer operation. This structure consists of the aforesaid torque input part, torque transmission part, and torque output part, and operates as a single rotating assembly at the time when the aforesaid rollers are residing in the aforesaid concavities. However, an excessive load generated from the torque limiter's output side will overcome the preload applied to the rollers with the result that the rollers are forced out of the concavities. This action disengages the mechanical connection between the input and torque output parts, allows said parts to rotate independently, and thus interrupts the transmission of torque from the input to the output side.

In this type of torque limiter, bearings are utilized as means of providing rotational support for the torque input and output parts. Multiple bearings, in the form of separate thrust and radial bearing units, have been conventionally required as means of maintaining the torque input and output parts in precise orientation during their rotation.

The torque limiter presented by the aforesaid Japanese unexamined patent publication No. 53-67407 prescribes the use of needle and ball bearings to support loads on the thrust axis, and needle bearings on the radial axis. The torque limiter presented by the aforesaid Japanese unexamined utility model publication No. 4-68228 prescribes a pair of ball bearing structures installed over a flange formed on the inner periphery of the aforesaid torque output part, said bearings having the purpose of receiving both radial and axial thrust loads applied through the aforesaid flange.

The torque limiter prescribed by the aforesaid publication No. 53-67407 utilizes three separate bearings, and that prescribed by the aforesaid publication No. 4-68288 utilizes two bearings. Both of these patents prescribe torque limiter structures in which radial and thrust loads are received by correspondingly separate bearing units, thus necessitating that space be provided for these multiple bearings.

Moreover, the preload, which is applied to the rollers installed between the torque input and torque output parts, operates against the torque output part, thus necessitating that the bearing at the torque output part not only be strong enough to support operating loads, but be further capable of withstanding roller preload. This design results in a relatively complex bearing structure which necessitates that the torque limiter be fabricated to dimensions that are often larger than preferred. Furthermore, applying roller preload against the torque output part necessitates that the torque output part be made to a relatively thick dimension. Considering that the torque input part is solidly fixed to the shaft emanating from the torque generating power source, and that it offers an inherently high degree of strength and sufficient thickness, it would thus seem preferable to preload the rollers against the torque input part only.

As can be inferred from the above discussion, the use of multiple bearing units, the need for high-strength bearings, and the necessity of fabricating the torque output part to sufficient thickness to withstand roller preload can be construed as structural shortcomings that result in a torque limiter requiring fabrication to external dimensions which are often larger than desired.

SUMMARY OF THE INVENTION

Then invention puts forth a structure for a torque limiter device wherein a single ball bearing structure is able to provide adequate rotational support in both radial and axial thrust directions, wherein the thickness of the aforesaid torque output part can be substantially reduced, and wherein the entire structure of the torque limiter can be made thinner and to more compact dimensions.

The torque limiter put forth by the invention is comprised of oppositely facing torque input and output parts capable of mutual engagement and disengagement.

The invention further incorporates a torque transmission part capable of engaging the aforesaid torque input and torque output parts as means of transmitting torque therebetween, or conversely capable of disengaging said torque input and output parts as a means of preventing torque transmission therebetween.

The invention also employs a torque control means capable of maintaining the aforesaid torque transmission part in an engaged condition when applied torque is lower than a specific level, and further capable of allowing release of the aforesaid torque transmission part when applied torque is higher than the aforesaid stipulated level.

The invention further incorporates a single bearing structure which rotatably supports both the aforesaid torque input and output parts, maintains contact at two points within an outer radial groove formed on an inner circumference of the aforesaid torque output part, and also maintains contact at two points on an inner radial groove surface formed on an outer circumference of the aforesaid torque input part.

The aforesaid torque control means applies pressure to the torque transmission part as means of maintaining a rigid connection between the torque input and torque output parts. In cases where applied torque rises beyond a specific level, that torque overrides the joint-maintaining pressure applied by the torque level control means, thus releasing the torque transfer connection and allowing the torque input and output parts to rotate independently as means of releasing excess torque.

The invention puts forth a structure wherein a single ball bearing unit is installed between an inner radial groove formed on the torque input part, and an outer radial groove formed on an inner periphery of the torque output part. The ball bearings contact each of the aforesaid radial grooves at two points on their respective circumferences, thus providing four points of support between the torque input and output parts. This structure allows one ball bearing assembly to accept both radial and axial thrust loads applied to the torque limiter, and to provide adequate support during differential rotation of the input and torque output parts. As a result of this structure, the number of required bearing units is reduced, thus allowing the torque limiter to be made to smaller and more compact dimensions than other types current in the art.

An orifice is formed through the torque output part, said orifice serving as a housing in which the torque transmission part resides. A spheroid concavity is formed on the face of the torque input part, opposite to the aforesaid orifice, and serves as means of supporting the aforesaid torque transmission part which forms a joint with the aforesaid spheroid concavity by means of pressure applied by the aforesaid torque control means.

As a result of this structure, in which the torque transmission part engages the spheroid concavity on the torque input part through a supporting orifice formed within the torque output part, the pressure applied by the torque control means is applied only against the torque input part. This configuration allows the bearing support structure on the torque output part to be made smaller and thinner, and further allows the use of a smaller bearing. Moreover, the torque output part can be designed to smaller and thinner dimensions as it is not subject to the load imposed by the torque level control means.

Each of the aforesaid mutually facing inner and outer radial grooves are formed with a V-shape cross section having a radius of curvature smaller than that of the ball bearing. This structure provides ball bearing contact at only two points within each radial groove, and thus provides a total of four-points of bearing support which is capable of adequately withstanding both radial and axial thrust loads.

The aforesaid torque transmission part is comprised of a torque ball supported within the aforesaid orifice formed through the torque output part, said orifice being formed to the approximate diameter of the aforesaid torque ball. The spheroid concavity formed on the inner side of the torque input part is made to the approximate radius of the aforesaid torque ball, said torque ball being maintained in pressure contact thereon.

Tight and secure engagement and adequate positional accuracy are maintained between the input and torque output parts by means of the aforesaid torque ball being held within the spheroid concavity on the torque input part. In this condition, mechanical play between the input and torque output parts is eliminated, and the structure operates as a single rigid rotating body.

The aforesaid spheroid concavities are formed on the torque input part at the same radius but non-uniform intervals. As a result of this structure, in cases where an overload causes the torque input and output parts to release and rotate differentially, the torque balls will release from their corresponding concavities without subsequently engaging other concavities. This operation provides a smooth torque limiting effect with minimal load placed on the torque limiter.

The input assembly consists of a hub race formed as an integral component of the aforesaid torque input part, a flange race capable of installation to or removal from the aforesaid hub race, and an inner radial groove whose cross section is formed both on the aforesaid hub race and detachable flange race. Removal of the flange race will open a clearance, which is larger than the diameter of the ball bearing, between the hub race and torque output part. This structure significantly simplifies bearing assembly by allowing the ball bearings to be easily inserted into the clearance between the torque output part and hub race when the detachable flange race is removed.

As a result of threaded fasteners being employed as means of installing the aforesaid detachable flange race to the hub race, the preload of the ball bearings against their four contact points in the inner and outer radial grooves can be finely adjusted through the tightening torque applied to the aforesaid fasteners. This structure provides for smooth and precise torque output by eliminating play and preventing the ball bearings from running loose in the radial grooves.

The aforesaid torque control means is installed between a first retainer plate attached to the torque input part, and a second retainer plate connecting to the torque transmission part. The connecting structure is comprised of a load plate, formed as a radially extending part of the second retainer plate, a rolling part, and a pressure plate maintained in contact with the torque transmission means.

As a result of the aforesaid second retainer plate structure, the load plate and pressure plate are able to smoothly rotate at different speeds around the rolling part when the torque input and output parts release as a result of an applied torque overload. Accordingly, the pressure applied by the torque control means between the first and second retainer plates is always uniform and consistent during operation of the torque limiter.

An overlapping joint structure is established by means of the aforesaid hub race meeting the inner circumference of the torque output part in a manner as to provide adequate clearance for insertion of the ball bearings between the torque part and the hub race. After ball bearings are inserted between the inner and outer radial grooves by means of the aforesaid clearance, the bearing structure is completed by installing the detachable flange race to the hub race with threaded fasteners. The aforesaid torque transmission part is installed within an orifice formed on the torque output part, and forms a joint with the torque input part by means of its insertion within the aforesaid spheroid concavity formed in the torque input part. Moreover, the aforesaid second retainer plate forms an overlapping joint with the torque output part by means of the aforesaid pressure plate held in contact with the torque transmission part. The first retainer plate is solidly attached to the torque input part, and is thus able to maintain the torque control means in a pressurized condition as means of applying pressure to the torque transmission part.

Due to the overlapping joint formed by the torque input part residing within the inner circumference of the torque output part, the structure maintaining engagement pressure between the torque input and output parts can be established completely on the output side of the torque limiter. This allows the torque limiter to be assembled through a procedure which consists of inserting the ball bearings, inserting the flange race and fasteners, placing the torque balls within the spheroid concavities on the torque input part through the orifices in the torque output part, and by installing the second retainer plate. Assembly of the torque limiter is subsequently completed after the installation of the first retainer plate to the torque input part. This type of structure provides for a torque limiter which can be easily assembled from one side, a significant advantage compared to types current in the art which require assembly operations to be performed on both sides.

The employment of a torque control pressure adjustment means allows variable adjustment of the distance between the first and second retainer plates, thus making it possible to change the amount of pressure applied to the spheroid concavity by the torque ball, and thus serving as means of setting the torque level at which the torque limiter disengages. The first retainer plate and torque input part are adjustably joined by means of mutually mating screw threads which allow adjustment of the aforesaid dimension between the first and second retainer plates, and thus provide a convenient mechanism for setting the amount of pressure applied by the torque level control means.

A sensor is employed to monitor for a disengaged condition of the torque transmission part and serves as means of shutting down the drive torque power source when the torque limiter has disengaged. As the drive torque power source can be shut down automatically when the torque transmission part disengages, a torque limiting operation is performed in which components within the torque limiter itself, as well as devices connected to the torque output part, can be reliably protected from overloads.

A thru-bore formed within the center of the torque input and torque output parts provides space for passage of wiring and conduits, thereby allowing the equipment connected to the torque limiter to be fabricated to smaller external dimensions.

DESCRIPTION OF PREFERRED EMBODIMENTS

The following discussion provides a detailed explanation of the structure of the invention with reference to the attached figures.

The main components of torque limiter 10 are boss 11 which operates as the aforesaid torque input part, and flange 12 which operates as the aforesaid torque output part; the aforesaid boss 11 and flange 12 being in mutually facing orientation and rotatable around the same axis. Boss 11 is of disc configuration, incorporates center hole 13 formed therein, and has flange 14 formed on its outer perimeter.

Flange 12 is of ring configuration whose inner circumference encompasses a radial perimeter formed around the center of flange 14 as means of forming rotatable joint 15.

Multiple orifices 16, formed through flange 12 at nonuniform intervals on the same circumference, serve as means of maintaining torque balls 17 therein, said torque balls 17 serving as the aforesaid torque transmission part. Spheroid concavities 18 are formed on the face of flange 14 at locations directly facing orifices 16 on flange 12, and provide a contact surface for torque balls 17. A torque transfer joint is formed between boss 11 and flange 12 when torque ball 17 is maintained in a pressurized condition within concavity 18. Specifically, concavity 18 is formed to the approximate radius of torque ball 17 in a manner as to form a joint with torque ball 17 when said torque ball is inserted therein. Furthermore, the inner wall of orifice 16 maintains torque ball 17 within flange 12, thus allowing torque ball 17 to serve as a drive member extending outward from the face of flange 12. In order to assure the mutually precise positioning of orifices 16 and concavities 18, it is preferable that said orifices and concavities be simultaneously machined while flange 12 and boss 11 are clamped together.

Torque ball 17 is maintained within spheroid concavity 18 by means of spring 19 which operates as the aforesaid torque control means. As spring 19 applies a specific pressure to torque ball 17, torque ball 17 will separate from concavity 18 if the torque load applied to the torque limiter exceeds that capable of being maintained by spring 19. Multiple coil springs 19 are installed in radial disposition within the space defined by first and second retainer plates 20 and 21 (this embodiment incorporates eight springs). First retainer plate 20 is of ring configuration. Adjustable screw thread joint 22 is formed between the inner circumference of a cylindrical flange on boss 11 and the outer circumference of a cylindrical flange formed on first retainer plate 20. Screw thread 22 thus provides means of variably adjusting the installed load of coil spring 19 by changing the distance between first plate 20 and second plate 21. Specifically, rotating first plate 20 on screw thread 22 will result in a positional change of first retainer plate 20 in relation to boss 11. End surface 11a of boss 11 faces first retainer plate 20, and thus provides a securing surface for fixedly attaching first plate 20 to boss 11 by means of four set bolts 23. Set bolts 23 are inserted through threaded bores provided on first plate 20, and screwed into contact with end surface 11a as means of rigidly securing first plate 20 to boss 11, thus preventing the inadvertent rotational movement of first retainer plate 20 on screw thread joint 22. An inner and outer lip on first retainer plate 20 encompass the end of spring 19 as means of stabilizing spring 19 in its installed position.

Second retainer plate 21 is also of ring configuration, and incorporates ring-shaped inner flange 21a which forms a sliding joint at an inner circumference of boss 11. Second retainer plate 21 further incorporates an outer flange part 21b extending beyond coil spring 19, said flange part 21b being maintained in contact with torque ball 17, and thus enabling the compression pressure of spring 19 to be applied to torque ball 17 through second retainer plate 21. Specifically, compressed spring pressure is applied to torque ball 17 through bearing structure 27, said bearing structure being formed by load plate 25, pressure ball 26, and pressure plate 24. Pressure plate 24 is formed as an part of the aforesaid extended flange of second retainer plate 21. Pressure plate 24 is of ring configuration, and forms a freely rotatable joint at radial channel 25a which is formed on the inner circumference of load plate 25. Stop ring 28 is installed within radial channel 25a as means of mutually maintaining pressure plate 24 and load plate 25 over rolling ball part 26.

Figure 5:
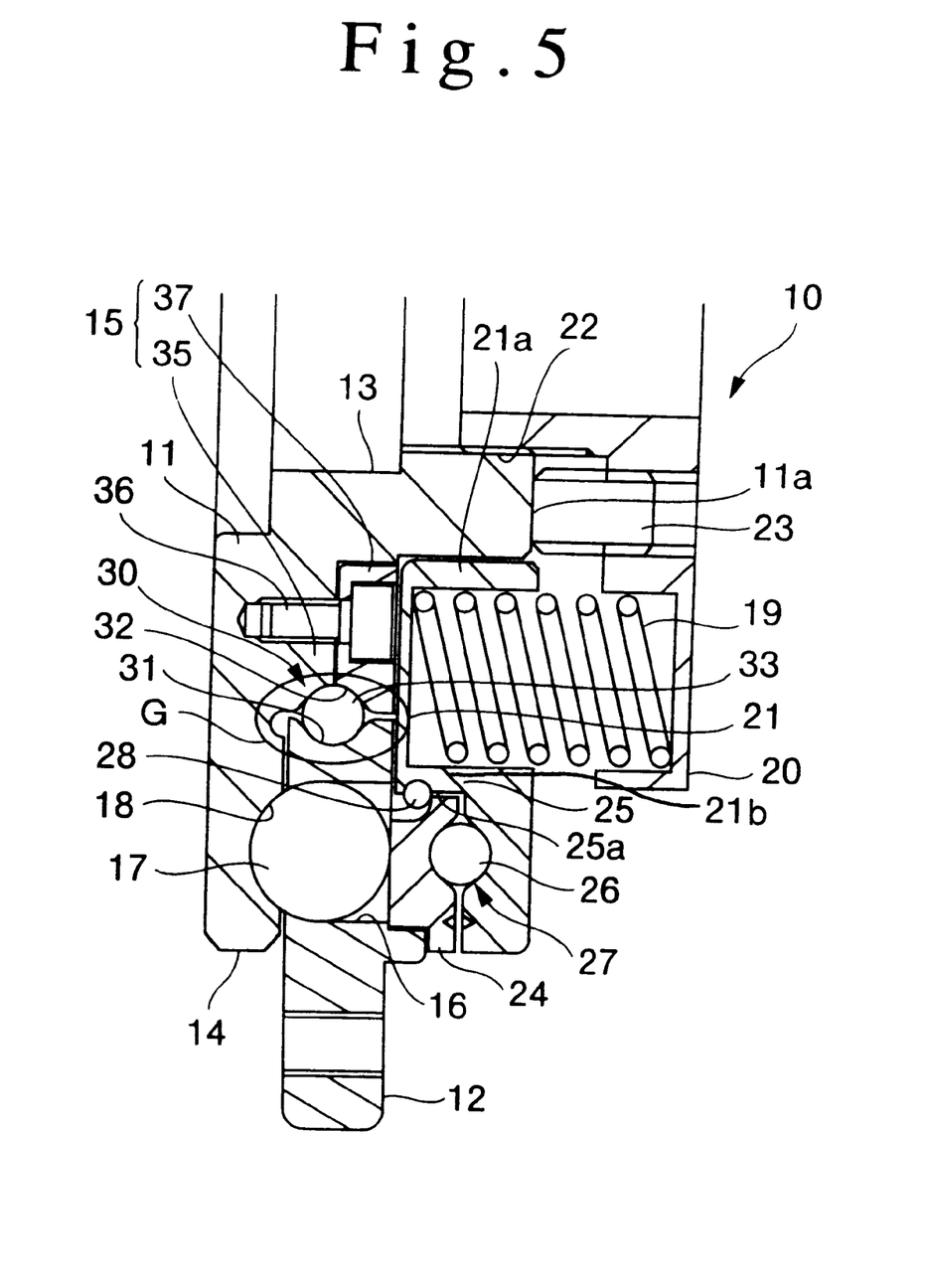
FIG. 5 is an enlargement of the cross section within circle B in FIG. 3.
Figure 10:
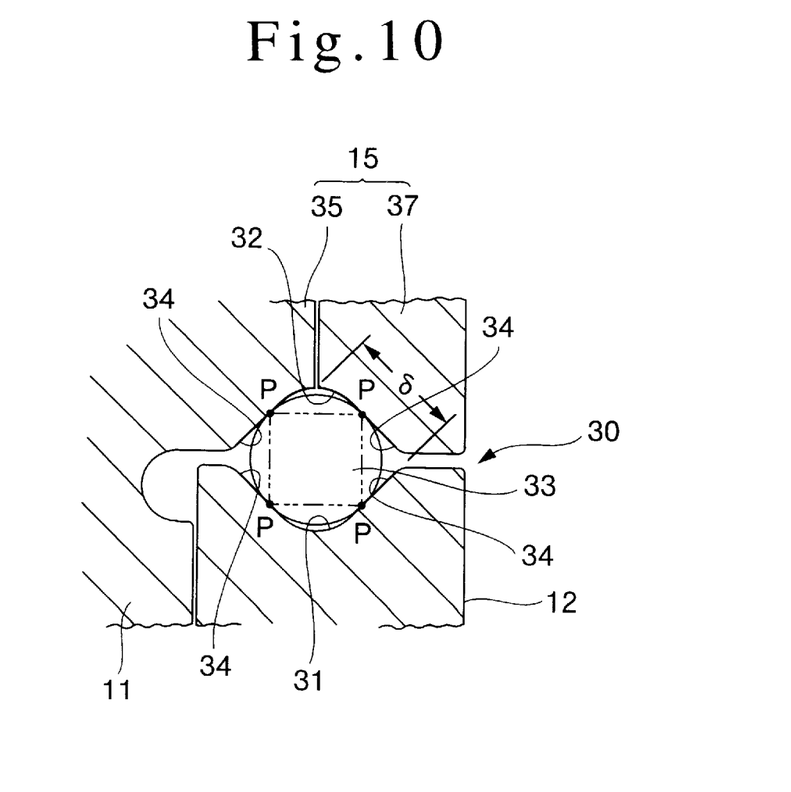
FIG. 10 is an enlarged cross section of the area shown by G in FIG. 5.

Flange 12 mates with boss 11 at the outer periphery of joint part 15 where bearing structure 30 is formed. Outer radial groove 31 is formed on the inner perimeter of flange 12 opposite to inner radial groove 32 which is formed on the outer perimeter of joint part 15. Bearing structure 30 is established by the insertion of multiple balls 33 between the aforesaid outer radial groove 31 and inner radial groove 32. As shown in FIGS. 5 and 10, a pair of ball bearing contact surfaces 34 are formed on each of the aforesaid radial grooves by means of establishing the groove cross section as V-shape having a radius of curvature smaller than that of the ball bearing. As the ball bearings come into contact with surfaces 34 at only two points in each radial groove, two pairs of opposing bearing contact points are established (shown as P in FIG. 10), therefore providing four bearing contact points arranged in a geometrically square pattern.

The connection between flange 12 to joint part 15 of boss 11 is established by means of installing flange race 37 to hub race 35 through bolts 36, thus jointly forming outer radial groove 32 on both flange race 37 and hub race 35. Removal of flange race 37 provides sufficient clearance between hub race 35 and flange 12 to allow removal and insertion of balls 33. Bolt 36 is employed to secure flange race 37 to hub race 35, thereby allowing the tightening torque applied by bolt 36 to establish the desired preload of ball bearing 33 against radial grooves 31 and 32.

Figure 11:
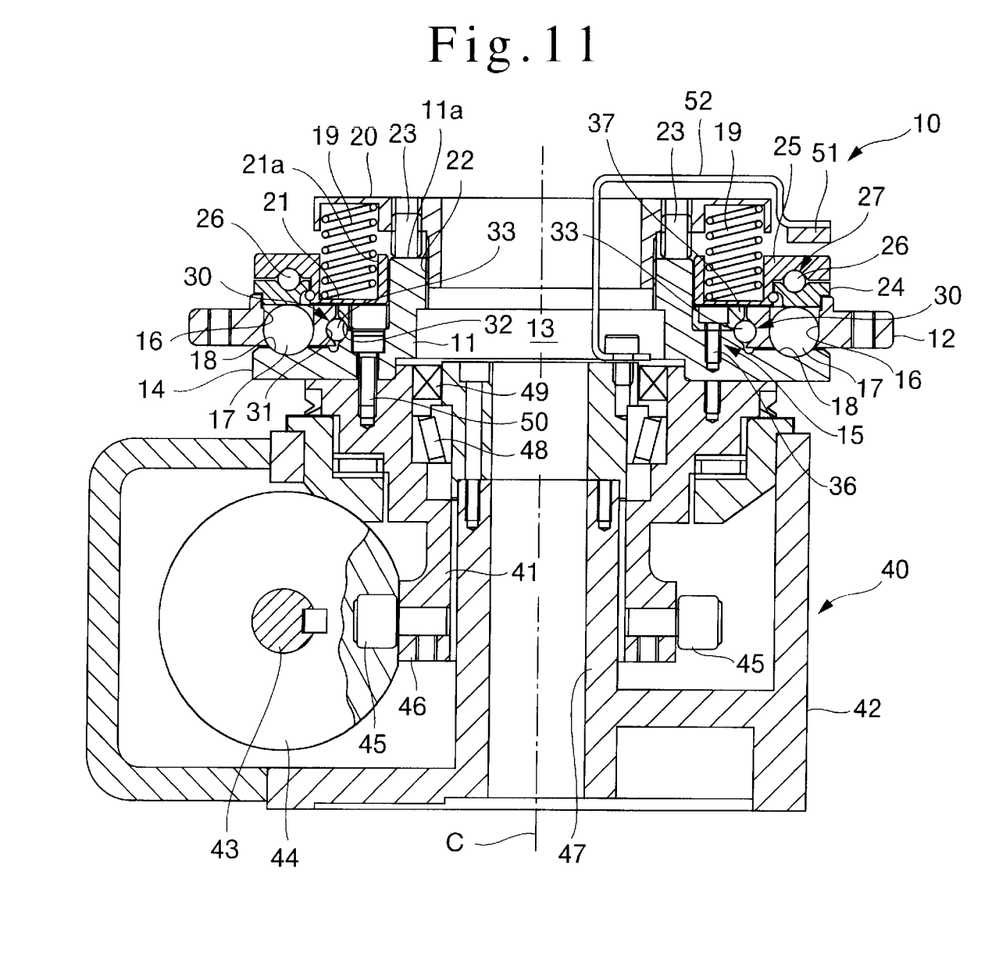
FIG. 11 is a cross section of the torque limiter installed to a drive unit.
Figure 12:
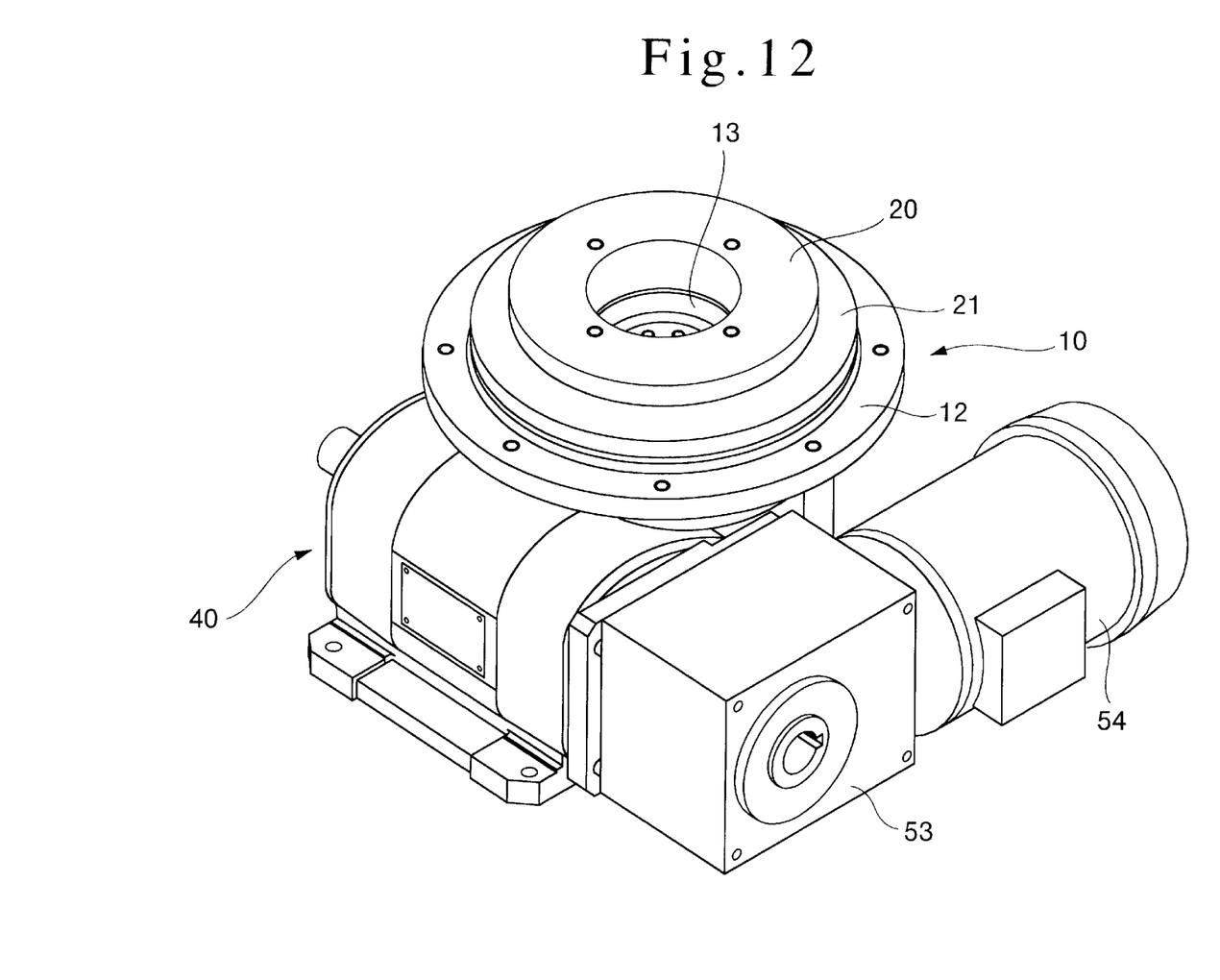
FIG. 12 is an oblique view of the torque limiter installed to a drive unit.

As shown in FIGS. 11 and 12, the torque limiter presented in this embodiment is installed to output shaft 41 of indexing unit 40. Indexing unit 40 provides a rotational or swing action positional indexing movement through a cam mechanism and reduction gearbox 53 powered by motor 54. Input shaft 42 drives output shaft 41 at a 90° angle by means of cam 44, and output shaft 41 drives turret 46 by means of the swing action of cam follower 45 running off of cam 44. The rotational action of input shaft 42 is converted to the desirable angle of swing at output shaft 41 through the operation of cam 44 and cam follower 45. Output shaft 41 is of axially hollow construction and supported in a rotatable condition on center line C within cylindrical bore 43 by means of bearing 48 and packing 49 are located at the top of case 42.

Torque limiter 10 is installed to the end of output shaft 41 through bolts 50 running through boss 11. Torque supplied by output shaft 41 is supplied sequentially to boss 11, flange 12, and subsequently to the device attached to flange 12.

High-frequency oscillating photo sensor 51 is attached to the top of cylinderwall 47 through plate 52, and is positioned over load plate 25 as means of monitoring for release of torque balls 17 from flange 14. A specific distance is maintained between load plate 25 and sensor 51 as long as torque balls 17 reside in concavities 18, and boss 11 and flange 12 rotate in unison. An excessive torque load applied to the torque limiter will cause torque balls 17 to separate from concavities 18 and push load plate 25 into closer proximity to sensor 51, thus tripping the sensor.

Figure 1:
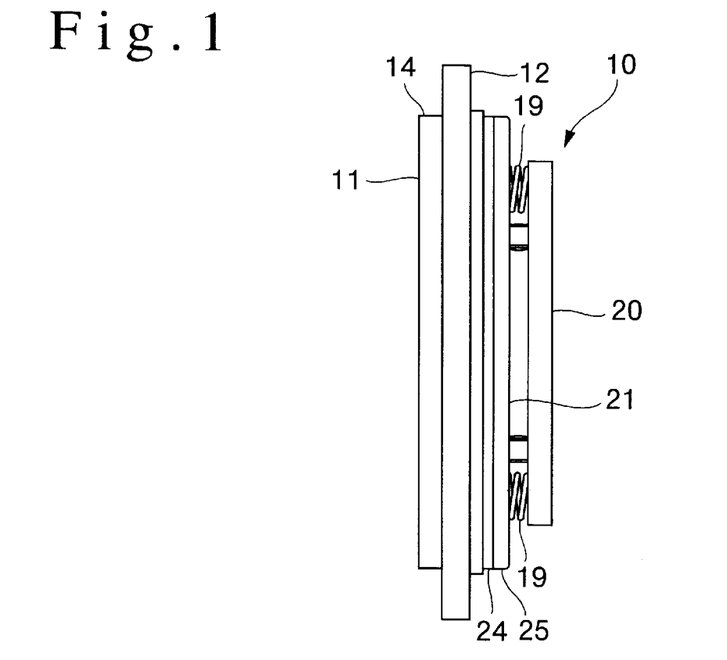
FIG. 1 is a lateral cross section of an embodiment of the invention.
Figure 2:
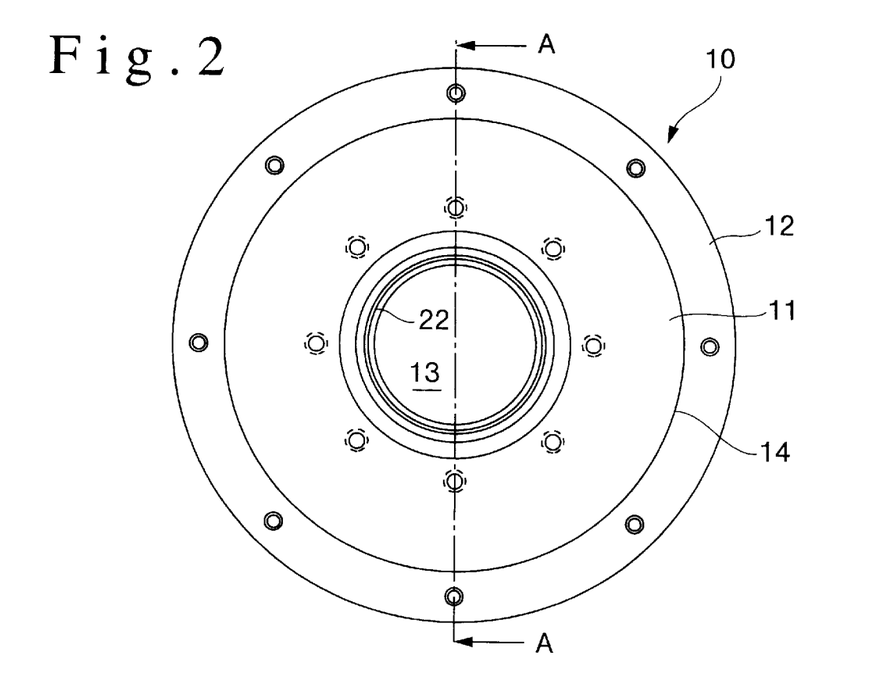
FIG. 2 is a plan view of the FIG. 1 embodiment.
Figure 3:
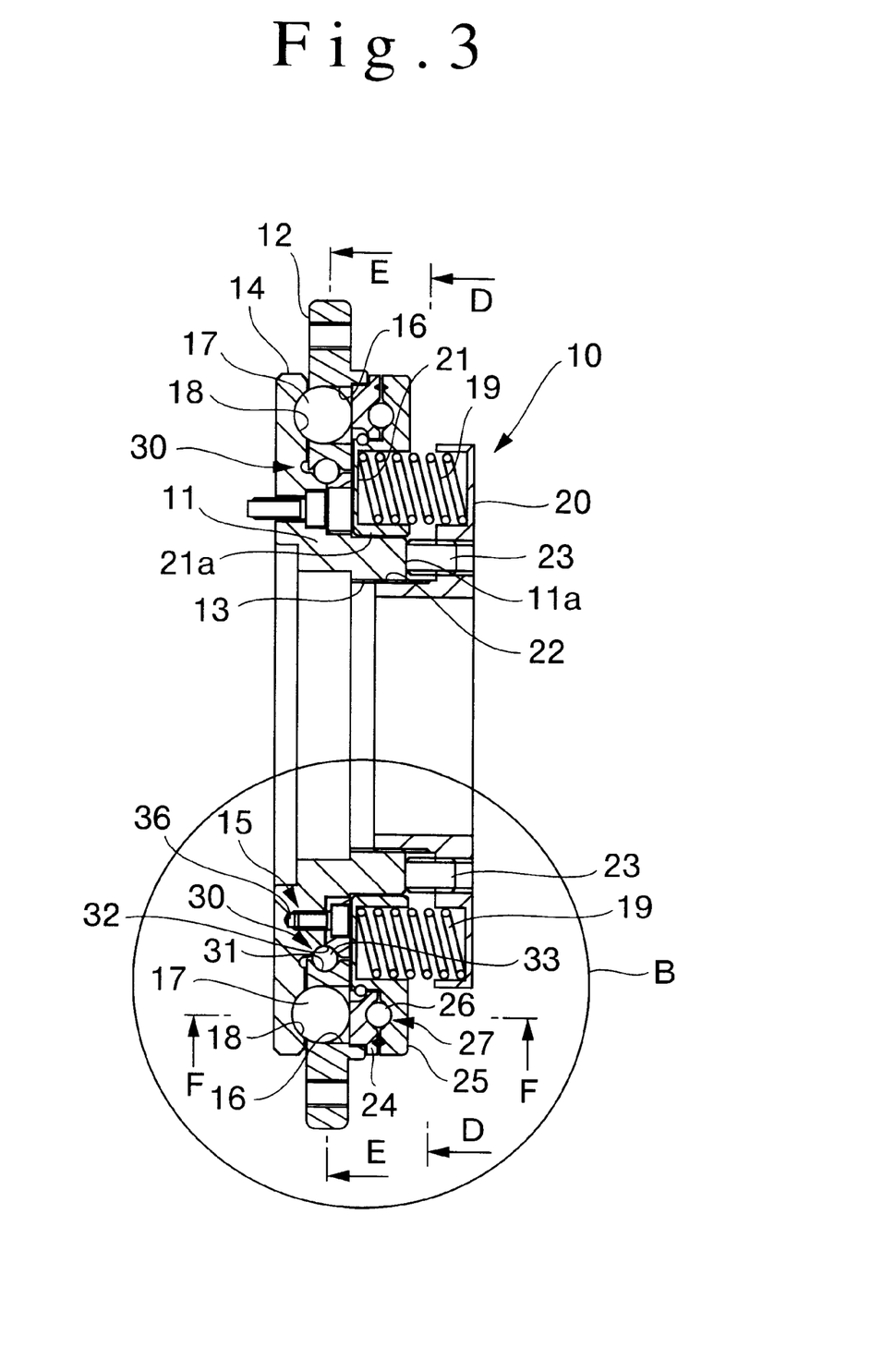
FIG. 3 is a cross section of the FIG. 2 embodiment between points A—A.
Figure 4:
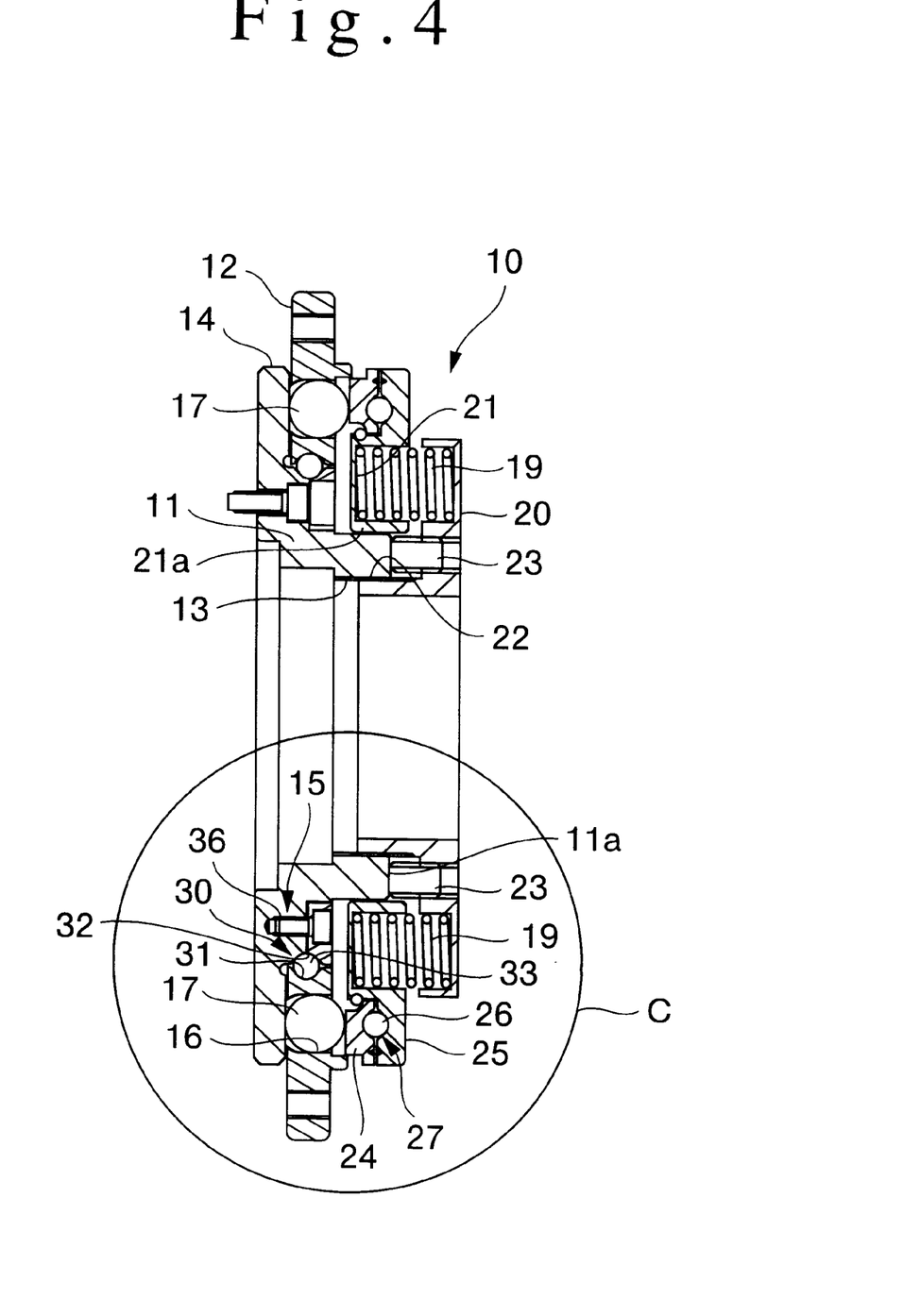
FIG. 4 is the FIG. 3 view with the torque transmission mechanism released.
Figure 6:
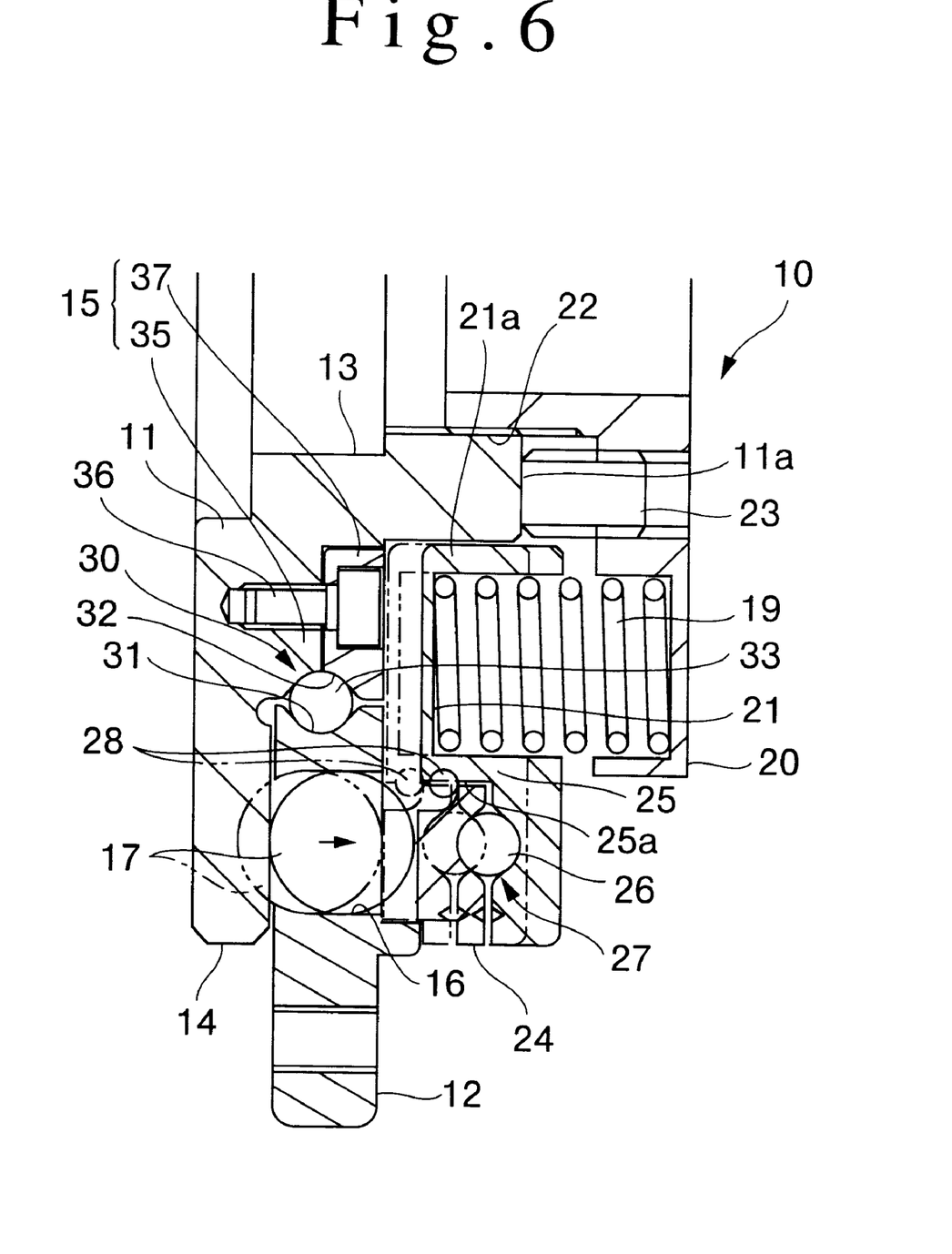
FIG. 6 is an enlargement of the cross section within circle C in FIG. 4.
Figure 7:
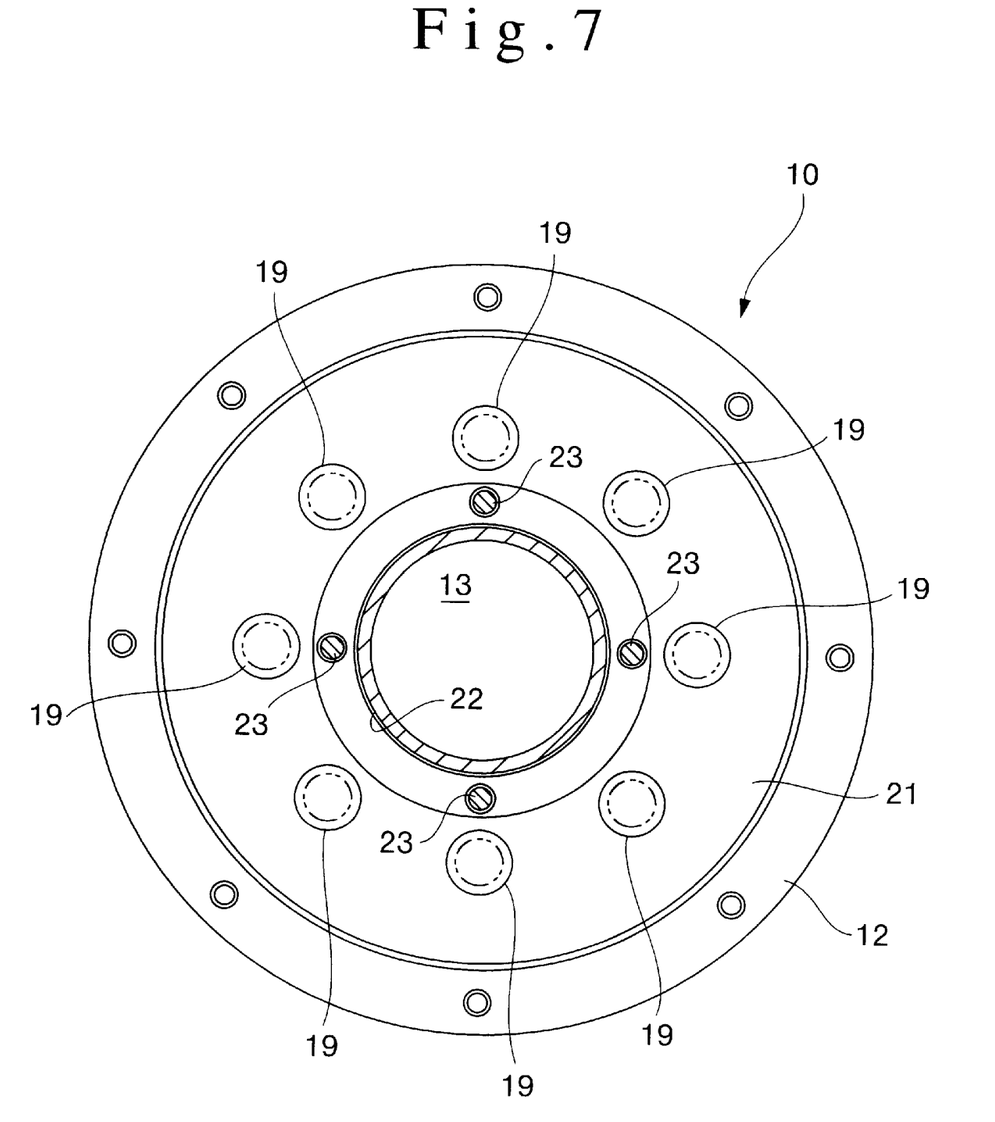
FIG. 7 is a cross section between points D—D shown in FIG. 3.
Figure 8:
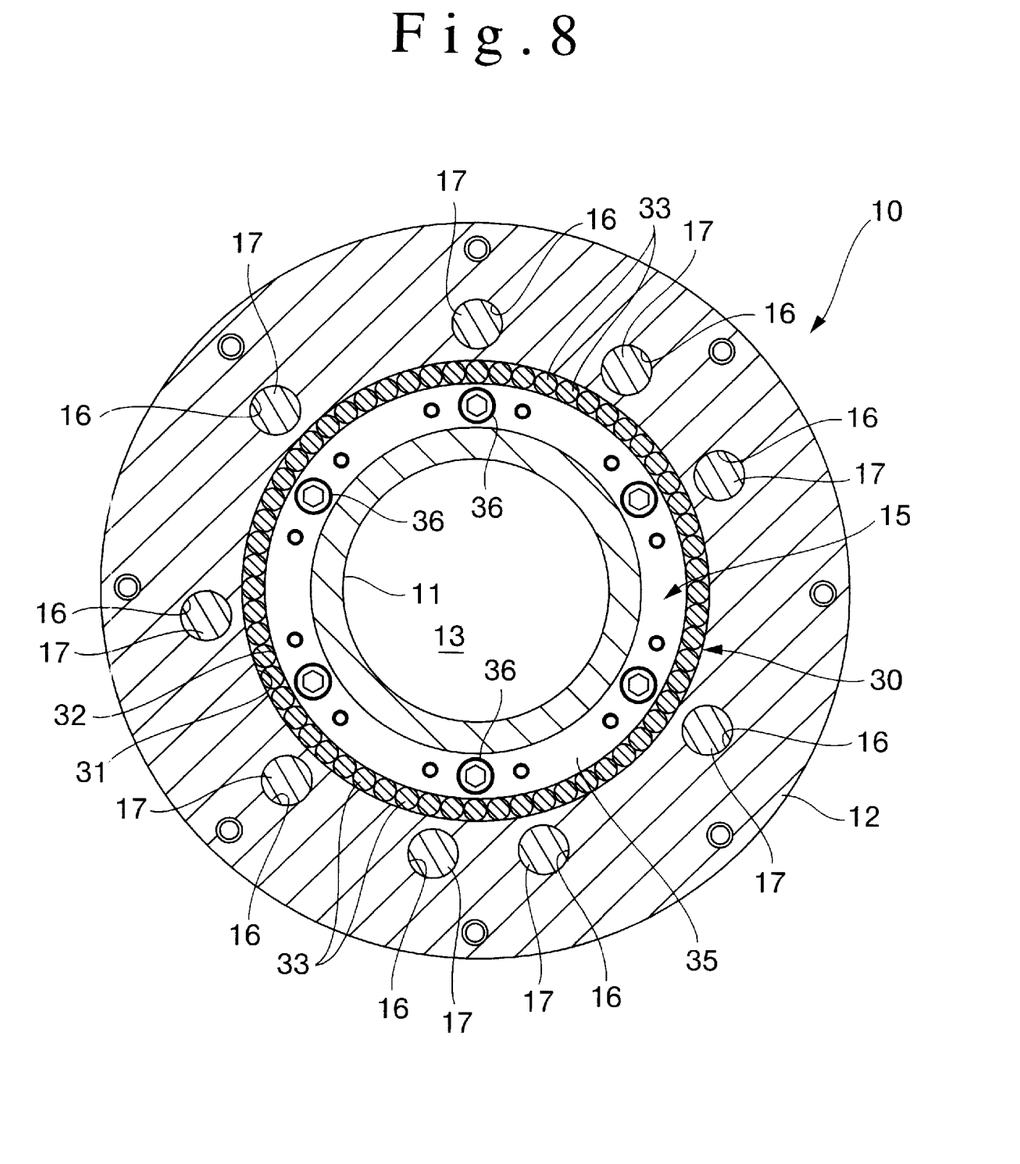
FIG. 8 is a cross section between points E—E shown in FIG. 3.
Figure 9:
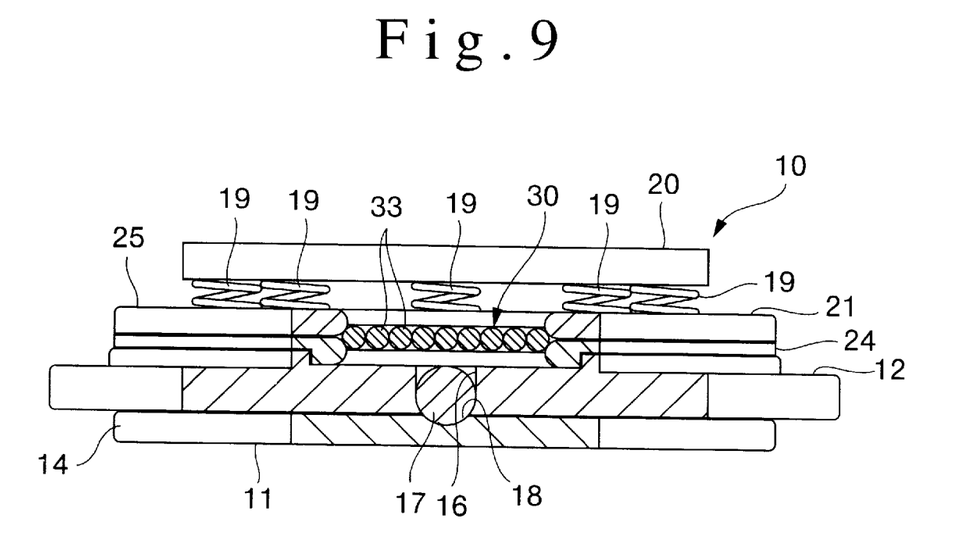
FIG. 9 is a cross section between point F—F shown in FIG. 3.

As stated previously, this embodiment provides means by which both a torque transfer and torque release function can be provided by torque limiter 10 through a mechanism capable of mutually connecting or releasing boss 11 and flange 12. As FIGS. 3 and 5 demonstrate, a rigid torque transmitting connection between boss 11 and flange 12 is maintained when torque ball 17 is fully inserted into concavity 18. As FIGS. 4 and 6 illustrate, release of torque ball 17 from concavity 18 allows boss 11 and flange 12 to rotate independently, and thus prevents the transfer of torque therebetween. As torque ball 17 is held within concavity 18 at a specific pressure determined by the compressive force applied from coil springs 19, the torque level at which torque ball 17 separates from concavity 18 is established by the aforesaid specific pressure.

A rotatable connection is formed between flange 12 and boss 11 by means of joint part 15. Ball bearing structure 30 is formed at joint part 15 by means of multiple balls 33 residing between outer radial groove 31 of flange 12 and inner radial groove 32 of joint part 15. Inner radial groove 32 and outer radial groove 31 each provide two ball contact points, thus comprising a single bearing structure offering four points of ball support capable of supporting both radial and axial thrust loads between flange 12 and boss 11. Because this single ball bearing structure maintains both boss 11 and flange 12 in accurate mutual alignment, the need for multiple bearing units is eliminated, thus allowing torque limiter 10 to be constructed to thinner and more compact dimensions. Moreover, the use of the aforesaid single ball bearing structure simplifies the design of the torque limiter, a factor which makes assembly faster and easier, and manufacture more efficient.

Furthermore, outer radial groove 31 and inner radial groove 32 each provide V-shaped ball contact surfaces 34 incorporating a radius of curvature less than that of ball bearing 33, thus providing four equidistant points of bearing contact (shown as P in FIG. 10). This type of bearing structure provides adequate support against both radial and axial thrust loads applied to flange 12.

As a result of the structure formed by torque ball 17 residing in orifice 16 in flange 12, and by torque ball 17 being maintained in pressure contact only against boss 11, flange 12 is not subjected to the pressure employed to form the joint between flange 12 and boss 11. Resultingly, the bearing support structure for flange 12 can be simplified and reduced in size, and balls 30 can be specified to a smaller size due to the reduced operating load. Moreover, flange 12 can be made to a thinner dimensions because it is not subject to the load generated by spring 19, thus allowing the torque limiter to be made to thinner dimensions.

Moreover, as torque ball 17 is pressurized indirectly through a structure in which pressure from spring 19 is applied to pressure plate 24 through ball 26 and load plate 25, and in which only pressure plate 24 is in contact with torque ball 17, pressure plate 24 and load plate 25 are able to rotate independently by means of rolling ball 26, thus providing for smooth differential rotation between boss 11 and flange 12 when the torque transfer joint is released. This structure allows spring 19 to apply constant and uniform pressure, regardless of the status of the torque transfer joint, as there is no differential rotation between first and second retainer plates 20 and 21.

Furthermore, highly accurate rotational and radial positioning stability are maintained in the connection between boss 11 and flange 12 as a result of concavity 18 being formed to the approximate radius of torque ball 17, and of pressurizing torque ball 17 within concavity 18 on boss 11. While the embodiment put forth here depicts orifice 16 as a round bore having the approximate diameter as that of torque ball 17, the cross section of orifice 16 may also be formed to other shapes such as a square which may still provide sliding surfaces for torque ball 17.

Joint part 15 is comprised of hub race 35, which is formed as an integral component of boss 11, flange race 37, which is installable to or removable from hub race 35, inner radial groove 32 which is established jointly by hub race 35 and flange race 37, and ball bearing 33. The removal of flange race 37 opens a clearance between hub race 35 and flange 12, said clearance being larger than the diameter of ball 33. As a result, this structure provides for a simple assembly procedure in which flange 12 is initially assembled to the perimeter of hub race 35 after which balls 33 are inserted and flange race 37 installed.

Furthermore, a preload fine adjustment mechanism for ball bearing 33 is provided by means of the structure in which flange race 37 is attached to hub race 35 by means of bolt 36, thus forming a structure which allows the tightening torque applied to bolt 36 to establish the preload on ball bearing 33. This preload mechanism prevents the ball bearings from running loose, eliminates mechanical play within the bearing structure, and enables flange 12 to rotate smoothly and accurately.

Moreover, screw threads 22, formed on an inner perimeter of first retainer plate 20, mate with corresponding screw threads formed on the inner bore of boss 1, thus providing means of adjustably establishing the position of first retainer plate 20 in relation to boss 11. Rotating first retainer plate 20 on the screw thread will alter the retainer plate's position relative to boss 11, thus changing the distance between first retainer plate 20 and second retainer plate 21 and the compressed length of spring 19 installed therebetween. This mechanism provides for adjustment of the pressure applied by spring 19 to torque ball 17 in concavity 18, and thus serves as means of setting the torque release point of the torque limiter.

This embodiment of torque limiter 10 shows the inner circumference of ring-shaped flange 12 joined to an outer circumference of disc-shaped boss 11, and center hole 13 established through both of the aforesaid components along rotational centerline C. This structure allows wiring and conduits to be conveniently routed through the center of the torque limiter. For example, movement sensor 51 is mounted in proximity to load plate 25, and the sensor signal wire is run through center hole 13. As center hole 13 provides means of internally routing wires and conduits through the torque converter, indexing device 40 can be made to more compact dimensions. This embodiment depicts output shaft 41 (of index device 40) fixedly connected to boss 11 of torque limiter 10 in a manner which establishes center hole 13 on the same center line as cylinder 43 in case 40, thus opening a passageway through both torque limiter 10 and transmission case 40.

Moreover, sensor 51 is able to monitor the release of torque ball 17 from concavity 18, a condition which indicates a torque overload and disengagement of the torque transfer joint. A signal output from sensor 51 can be applied to shut down motor 54 as means of releasing stress and preventing mechanical damage to torque limiter 10, index mechanism 40, and devices connected to flange 12.

Furthermore, this embodiment puts forth a structure in which orifices 16 on boss 11 are radially arranged at non-uniform intervals in relation to torque balls 17 held in flange 12. This arrangement prevents torque balls 17 from falling into adjacent concavities when plate 12 and boss 11 rotate differentially as a result of the release of the torque transfer joint, and thus promotes smooth differential rotation between flange 12 and boss 11 while minimizing the load applied to the torque limiter.

Moreover, as hub 11 is joined to flange 12 through hub race 35 which resides within the inner circumference of flange 12, clearance is provided for the insertion of balls 30.

With flange race 37 removed, bearing structure 30 (comprised of inner radial groove 32, outer radial groove 31, and balls 33) can be assembled by simply inserting balls 30 after which flange race 37 is installed by means of bolts 36. Torque balls 17 are then inserted into orifices 16 where they form a joint with concavities 18 in boss 11. Pressure plate 24 is placed on torque balls 17 after which balls 26 and load plate 24 (second retainer plate 21) are installed. Springs 19 are placed on second retainer plate 21 and first retainer plate 20 is installed over springs 19 and rotatably screwed onto boss 11 as means of compressing springs 19 and applying joint engagement pressure to torque balls 17. Because boss 11 resides within the inner circumference of flange 12; balls 33, flange race 37, torque balls 17, second retainer plate 21, coil springs 19, and first retainer plate 20 can all be installed and assembled from the output side of the torque limiter. This structure provides for a simpler and more efficient assembly procedure compared to conventional torque limiters which require assembly operations to be executed from both sides of the torque converter.

What is the claimed is:

1. A torque limiter comprised of mutually facing torque input and output parts capable of mutual engagement and disengagement,
   a torque transmission part capable of mutually engaging or disengaging said torque input and output parts for transmitting or releasing torque applied therebetween,
   torque control means for maintaining said torque transmission part in an engaged condition when applied torque is lower than a stipulated level, and further capable of allowing release of the engaged condition of said torque transmission part when applied torque is higher than the aforesaid stipulated level, and
   a ball bearing structure rotatably supporting both said torque input and output parts, ball parts employed by said bearing structure being maintained in contact at two points on an outer groove surface formed on an inner circumference of said torque output part, and at two points on an inner groove surface formed on an outer circumference of said torque input part,
   wherein said torque transmission part resides in multiple orifices formed through said torque output part, said torque input part has a plurality of concavities opposite to said orifices, and said torque control means operates said torque transmission part as means of forming a joint between said torque transmission part and said concavities such that operation of said torque control means is not applied to said torque output part.

2. A torque limiter as set forth in claim 1 wherein an axial opening is provided through said torque input and output parts along the rotating axis.

3. A torque limiter as set forth in claim 1 wherein each of said inner and outer radial grooves of said ball bearing structure are formed as a V-shape cross section having a radius of curvature smaller than said ball parts.

4. A torque limiter as set forth in claim 1 wherein,
   said torque transmission part is established as a spherical body,
   said concavities are is formed to the same contour of said spherical body as means of forming a joint with said torque input part, and
   the inner wall of said orifices is formed so as to provide a supporting surface against which said spherical body slides.

5. A torque limiter as set forth in claim 1 wherein non-uniform circumferential intervals are established between said orifices and said concavities on the corresponding torque output and input parts.

6. A torque limiter as set forth in claim 1 wherein said inner radial groove is established partially by a hub race integrally formed within said torque input part and partially by a detachable flange race, said hub race and said flange race being disposed in a manner as to provide adequate clearance for insertion or removal of said ball parts when said flange race is removed.

7. A torque limiter as set forth in claim 6 wherein fastener parts are provided as means of securing said detachable flange race to said hub race, the tightening torque of said fastener parts being employed as means of applying preload on said ball bearings.

8. A torque limiter as set forth in claim 7 wherein said torque control means is provided between a first retainer plate and a second retainer plate, said first retainer plate is fixedly attached to said torgue input part, and said second retainer plate is joined to said torque transmission part by means of a pressure plate maintained in contact with said torque transmission part, a load plate in contact with said torque control means, and a rolling part residing between said pressure plate and said load plate.

9. A torque limiter as set forth in claim 8 wherein, said hub race is initially installed so as to form a rotatable joint with said torque output part at an inner circumference formed therein, said bearing structure, comprised of said ball parts residing between said inner and outer radial grooves, is constructed by inserting said ball parts through said clearance established between said torque output part and said hub race, and by securing said ball parts within said radial grooves by means of employing said threaded fastener parts to install said detachable flange race to said hub race, said torque transmission part is joined to said concavities on said torque input part by means of said orifices formed in said torque output part, said second retainer plate, comprised of a structure in which said pressure plate is rotatably installed to said load plate by means of said rolling part, is installed so as to maintain contact with said torque output part, said torque control means is installed to said second retainer plate, and said first retainer plate is installed to said torque input part as means of establishing the operating pressure of said torque control means.

10. A torque limiter as set forth in claim 8 wherein adjustment means are employed to variably alter the distance between said first and second retainer plates as means of setting the operating pressure applied by said torque control means.

11. A torque limiter as set forth in claim 10 wherein said adjustment means is comprised of a rotatable threaded screw joint between said first retainer plate and said torque input part.

12. A torque limiter as set forth in claim 1 wherein a sensor is provided as means of detecting a released condition of said torque transmission part, said sensor being employed as means of shutting down a power source when the released condition is detected.

* * * * *